United States Patent [19]

Glover

[11] 4,190,403
[45] Feb. 26, 1980

[54] FLUID FLOW STABILIZER AND PHASE SEPARATOR

[75] Inventor: Robert C. Glover, Ventura, Calif.

[73] Assignee: Fluid Kinetics Corporation, Ventura, Calif.

[21] Appl. No.: 867,545

[22] Filed: Jan. 6, 1978

Related U.S. Application Data

[63] Continuation-in-part of Ser. No. 750,307, Dec. 13, 1976, abandoned.

[51] Int. Cl.$^2$ ............... F04B 11/00; F16L 55/04
[52] U.S. Cl. ........................... 417/543; 137/207; 138/26
[58] Field of Search ........... 417/540, 543; 137/207; 138/26; 55/205

[56] References Cited

U.S. PATENT DOCUMENTS

| | | | |
|---|---|---|---|
| 571,364 | 11/1896 | Hartman | 417/543 |
| 2,081,799 | 5/1937 | Doran | 137/207 |
| 2,315,179 | 3/1943 | Allender | 417/543 |
| 3,447,557 | 6/1967 | Phelps et al. | 137/207 |

FOREIGN PATENT DOCUMENTS

| | | | |
|---|---|---|---|
| 687966 | 2/1940 | Fed. Rep. of Germany | 55/205 |
| 1209493 | 3/1960 | France | 137/210 |

Primary Examiner—Richard E. Gluck
Attorney, Agent, or Firm—Nilsson, Robbins, Dalgarn, Berliner, Carson & Wurst

[57] ABSTRACT

A stabilizer is disclosed, as for use at the intake to a fluid pump, comprising a tank for containing a reservoir of liquid for supplying the pump. Extending from and above the tank, a tube provides a dome to confine a volume of gas to dampen pulsations created by the pump. The gaseous phase (vapor) in the dome is maintained in the tank by a heater mounted on the dome in such a manner as to provide heat somewhat related to the need for increasing the volume of the gaseous phase. Increased heat transfer within the tank vaporizes liquid to increase the pressure of the gaseous phase resulting in an increase in volume.

4 Claims, 2 Drawing Figures

FLUID FLOW STABILIZER AND PHASE SEPARATOR

RELATED SUBSTANCE

This application is a continuation-in-part of co-pending patent application Ser. No. 750,307 filed Dec. 13, 1976, by the present inventor, now abandoned in favor of Ser. No. 920,880, currently pending.

BACKGROUND AND SUMMARY OF THE INVENTION

The operation of various fluid pumps and other apparatus creates pulsations, as on the suction side of the pump which may be quite troublesome. As a consequence, it has been proposed to provide a form of hydraulic accumulator to dampen pulsations created by abrupt changes in flow attendant pump operation. Some forms of such apparatus have been expanded to provide other additional functions as well. Specifically, the accumulator structure may incorporate a small fluid storage capacity to assure a full charge of liquid to the pump on demand. Also, the volume of fluid acoustically uncouples the pump from the intake line with beneficial results. It has also been proposed to provide the tank in such a manner that entrained gas or vapor is removed from the liquid delivered to the pump in which such gas may create partial cavitation. Structures of this type have been produce and sold by Fluid Kinetics Corporation, Ventura, California, and are generally designated by the name: stabilizer/separator.

Stabilizers as described above have been improved by incorporating a structure for supplying heat to the inside of the stabilizer tank so as to maintain the gaseous volume within the tank and avoid the necessity for replenishing the gas from an external source. Somewhat more specifically, in the parent hereto a system is disclosed which incorporates a source of heat which functions in cooperation with an elongate tube extending upwardly in the tank. The heat source affords a self-regulating system in that as the liquid-gaseous interface moves to increase the heat-transfer relationship between the liquid and the coil, an increased quantity of liquid is vaporized to increase the pressure in the gaseous volume and thereby move the liquid-gaseous interface to reduce the degree of contact with the coil. In the present system, the interface is provided in a dome for greater stability thereby permitting the maintenance of the temperature differential for preserving the vapor volume.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment herein. Consequently, the specific structural and functional details disclosed herein are merely representative; yet in that regard they are deemed to provide the best embodiment for purposes of disclosure and to establish a foundation as a basis for the claims herein which define the scope of the present invention.

Figure 1:
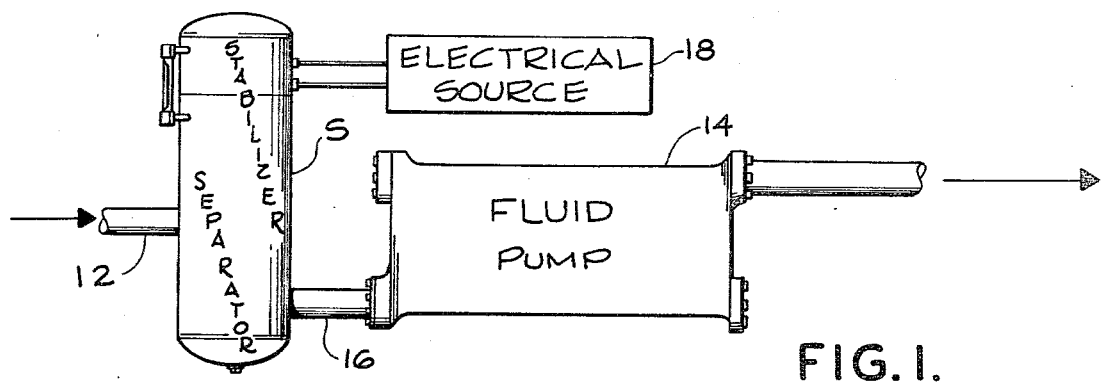
FIG. 1 is a diagrammatic representation of a system incorporating a stabilizer constructed in accordance with the present invention.

Referring initially to FIG. 1, there is shown a fluid supply line 12 which is connected to provide a fluid stream through a stabilizer S (embodying the present invention) to supply a liquid pump 14 via a line 16. As suggested above, it is characteristic of the pump 14 to create undesirable pulsations in the line 16 upon the abrupt changes in flow occurring as, for example, when valves within the pump open and close. Functionally, the stabilizer S provides a volume of gas or vapor interfacing a liquid reservoir for supplying the pump 14. As a consequence of the capacitive or cushioning effect of the gaseous volume, pulsations in the line 16 are somewhat isolated from the line 12. Furthermore, the liquid reservoir in the stabilizer S provides a full charge of fluid to the pump 14 to avoid cavitation. Also, the reservoir of fluid in the stabilizer S acoustically uncouples the pump from the line 12.

In the operation of the stabilizer S, a volume of gas is contained somewhat quiescently in the stabilizer S to provide the desired dampening by a capacitive or "spring" effect. In accordance with the present invention, the requisite volume of gas is maintained at the upper portion of the stabilizer S by utilizing a somewhat isolated space that is heated by energy from a source 18 to vaporize liquid if necessary.

Figure 2:
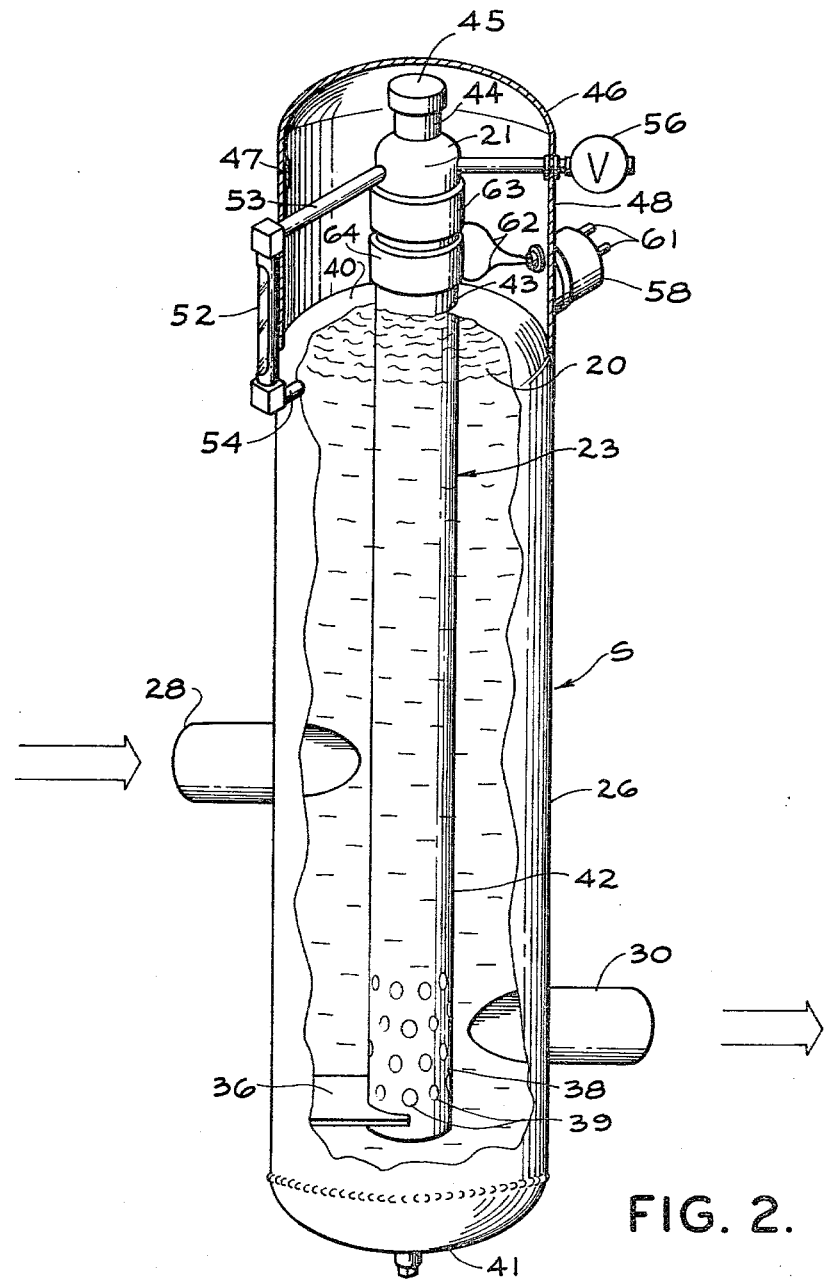
FIG. 2 is a sectioned perspective view of the stabilizer of FIG. 1.

Referring to FIG. 2, the stabilizer S is illustrated in detail and indicated to contain a reservoir 20 of liquid which is in contact with a volume of gas that is contained in a dome 21 comprising the top of a tube structure 23. As indicated above, the gas in the dome 21 is sheltered, yet provides a capacitive or "spring" effect to absorb or relieve pulsations imparted to the reservoir 20 as from the associated pump 14 (FIG. 1).

Considering the structure of the stabilizer S in somewhat greater detail, a major component is a tank 26 containing the reservoir 20 and the tube structure 23. The tank 26 is generally cylindrical and in that regard entry and exit ducts 28 and 30 respectively are mounted tangentially to provide a low-velocity vortex action, the function of which is treated below.

At the cylindrical axis of the tank 26, the elongate tube structure 23 is supported at its lower end by a bracket 36. The concentric tube structure 23 includes a lower section 38 defining perforations 39 to provide communication to the upper part of the tubular structure 23 and accommodate the passage of gas which may be released from the moving liquid. Above the section 38, a solid section 42 is provided which is integral with the dome 21.

Considering the structure in greater detail, the cylindrical tank 26 is closed at its ends by caps 40 and 41 (top and bottom respectively) welded in position. The lower section 38 of the tubular structure 23 terminates well above the bottom cap 41. However, the solid section 42 of the tubular structure 23 passes concentrically through the upper cap 40 sealing the upper end of the tank 26 closed and providing the dome 21 for the gaseous cushion. From the annular seal 43 (weld) between the tube section 42 and the cap 40, the tube section 42 extends upwardly about one-sixth of the tank length above the cap 40 and is terminated by an end closure including a head in the form of a short pipe 44 carrying a cap 45. These members are welded together to seal the dome 21.

The assembly of the dome 21 is enclosed by a cover 46 which is divided along a rim junction 47 to enable access to the dome 21. A cylindrical section 48 of the cover 46 supports a sightglass 52 for indicating the level of the liquid-gas interface in the stabilizer S. The ends of the sightglass are simply connected by tubes 53 and 54 to spaced-apart locations at the upper end of the stabilizer S.

The cylindrical section 48 of the cover 46 supports other components, specifically a relief valve 56 and an electrical junction box 58 which is adapted to be connected to the electrical power source 18 (FIG. 1) for supplying heat inside the stabilizer S. Specifically, from connection lugs 61 (FIG. 2) a pair of cables 62 supply electrical current to resistance heater bands 63 and 64 that are concentrically affixed on the exterior of the cylindrical section of the dome 21.

Recognizing that the system may be implemented in various forms, in the specific embodiment the energy source 18 comprises a source of electrical energy. In any event, the effectiveness of the heater bands 63 and 64 to vaporize liquid from the reservoir 20 is related to the volume of the gas, or the distance from the bands axially to the liquid-gas interface. Note that the level of the interface in the stabilizer S is manifest by the sightglass 52.

The stabilizer S may be manufactured utilizing a number of different techniques. However, in one form which has been determined to be effective the tank 26 is fabricated of welded metal along with the central tubular structure 23. In that regard, conventional shop practices are readily available to provide the structure and involve no problems that are not readily solvable to a mechanic of ordinary skill in the art.

In operation the stabilizer receives a stream of fluid (primarily liquid) through the duct 28. The tangential position of the intake duct 28 (along with that of the exhaust duct 30) result in a low-velocity vortex to increase the distance traveled by the fluid in moving between the ducts. The vortex stimulates the release of gas which may have been entrained in the liquid, which gas passes through the perforations 39, moving through the length of the tubular structure 23 into the dome 21. Accordingly, entrained gas or vapor may be removed from the stream so that it does not interfere with the operation of the pump 14 (FIG. 1) supplied by the stabilizer. Also in relation to the pump 14, the reservoir of fluid in the stabilizer S provides a full charge of liquid to the pump at a time when the pump valves open. The availability of such a reservoir tends to reduce cavitation in the pump. Still further, the reservoir acoustically uncouples the pump from the line carrying the stream of fluid to the duct 28.

Although the above functions are significant to the operation of the stabilizer, a prime consideration in the operation of the stabilizer S involves the dampening of pulsations created by abrupt flow changes to the pump as a result of the capacitive (cushion) effect of the gaseous phase in the dome 21. In that regard, it is important that the gaseous phase (in dome 21) be maintained and a quiescent volume is significant. That is, a quiescent space is provided in the dome 21 for the interface between the liquid and gas (vapor) to give stability to the vapor pocket or space. Consequently, the desired temperature differential can be maintained to preserve the vapor or gaseous volume. By providing the dome 21 at the top of the elongate tubular structure 23 (extending well into the tank 26) a quiescent space is afforded in which the gaseous volume can function. In that regard, at least a minimal volume is preserved by maintaining minimal pressure. Of course, in the event of excessive pressures, gas is vented off through the release valve 56. The occurrence of reduced pressures tends to reduce the volume of the gaseous space in the dome 21 with the result that the interface moves upward. As a consequence, an increased portion of the liquid is in heat-transfer relationship with the heater bands 63 and 64, the consequence of which is that more liquid is vaporized resulting in a pressure increase in the gaseous space. The increased pressure in the space tends to result in a volumetric increase in the space moving the interface downwardly in a compensatory action. Consequently, the system tends to be self-regulating whereby the gas-vapor interface 22 is maintained at an effective level without the necessity of replenishing the supply of gas. The consequence of such self-regulation is that the system may be operated for extended periods of time virtually free of any maintenance requirements.

As indicated, the structure herein may be variously embodied. Recognizing various modifications will be apparent, the scope hereof shall be deemed to be defined by the claims as set forth below.

What is claimed is:

1. A fluid stabilizer adapted to pass a fluid stream and for absorbing pulsations created by abrupt changes in the fluid stream, comprising:
   a closed tank of generally cylindrical configuration for receiving and delivering said fluid stream;
   a tubular structure affixed somewhat concentrically in said tank defining at least one opening at the lower portion thereof for access by said fluid stream, said tubular structure extending out of said tank at the upper end of said tank to define an extending portion;
   closure means at the upper end of said tubular structure for defining a space to retain a gaseous volume for capacitive action with said fluid stream; and
   means affixed to the exterior of said extending portion for heating said space to retain a gaseous volume by vaporizing fluid from said stream.

2. A fluid stabilizer according to claim 1 wherein said tank structure defines inlet and outlet ports for receiving and delivering said fluid stream and wherein said ports are tangentially located with reference to the cylindrical axis of said tank.

3. A fluid stabilizer according to claim 1 wherein said means for heating comprise an electrical means.

4. A fluid stabilizer according to claim 1 further including a fluid pump connected to said tank for carrying said fluid stream.

* * * * *